July 25, 1950     R. GOLDSCHMIDT     2,516,380
ALTERNATING CURRENT GENERATOR

Filed Nov. 16, 1948     5 Sheets-Sheet 1

INVENTOR,
Rudolf Goldschmidt
By Morris & Bateman
ATTORNEYS

July 25, 1950          R. GOLDSCHMIDT          2,516,380
ALTERNATING CURRENT GENERATOR
Filed Nov. 16, 1948          5 Sheets-Sheet 2
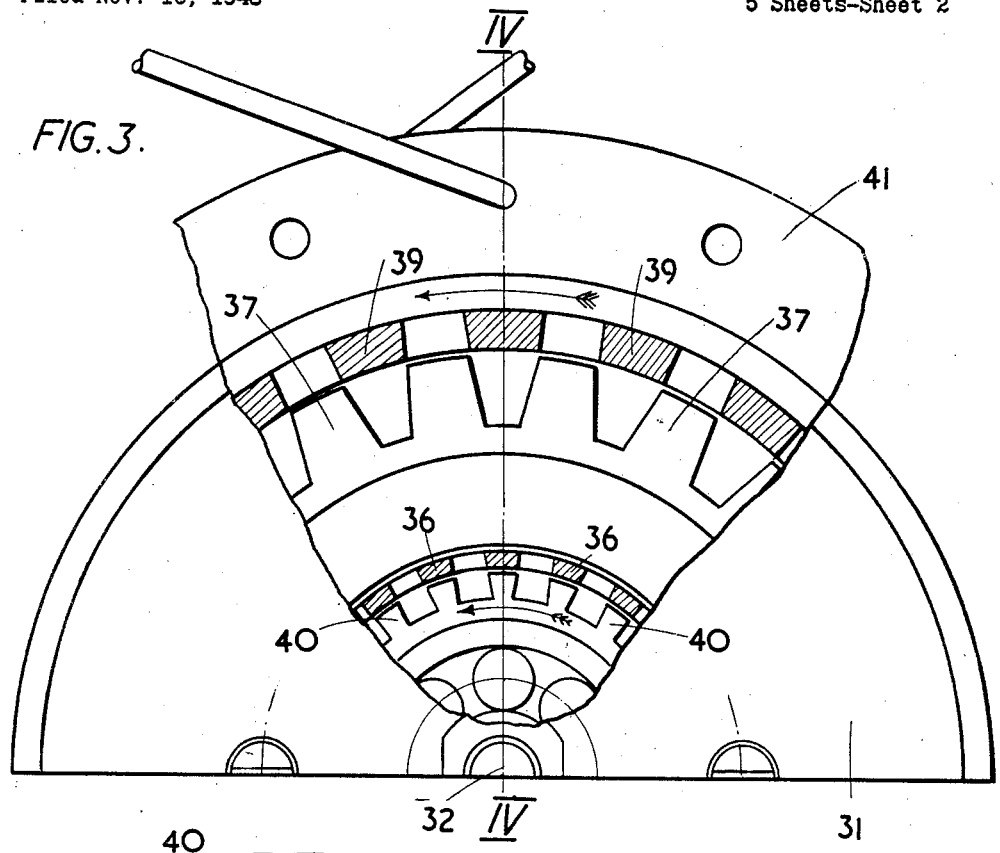
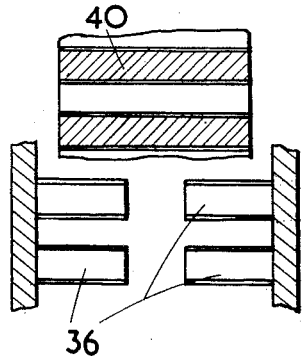
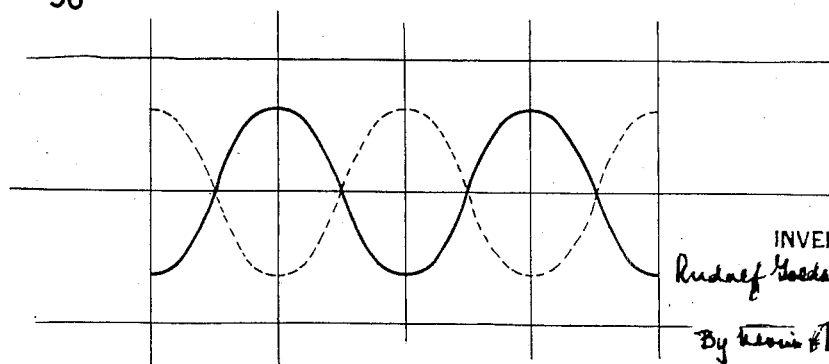
INVENTOR
Rudolf Goldschmidt
By Lewis & Bateman
ATTORNEYS July 25, 1950 R. GOLDSCHMIDT 2,516,380
ALTERNATING CURRENT GENERATOR
Filed Nov. 16, 1948 5 Sheets-Sheet 3
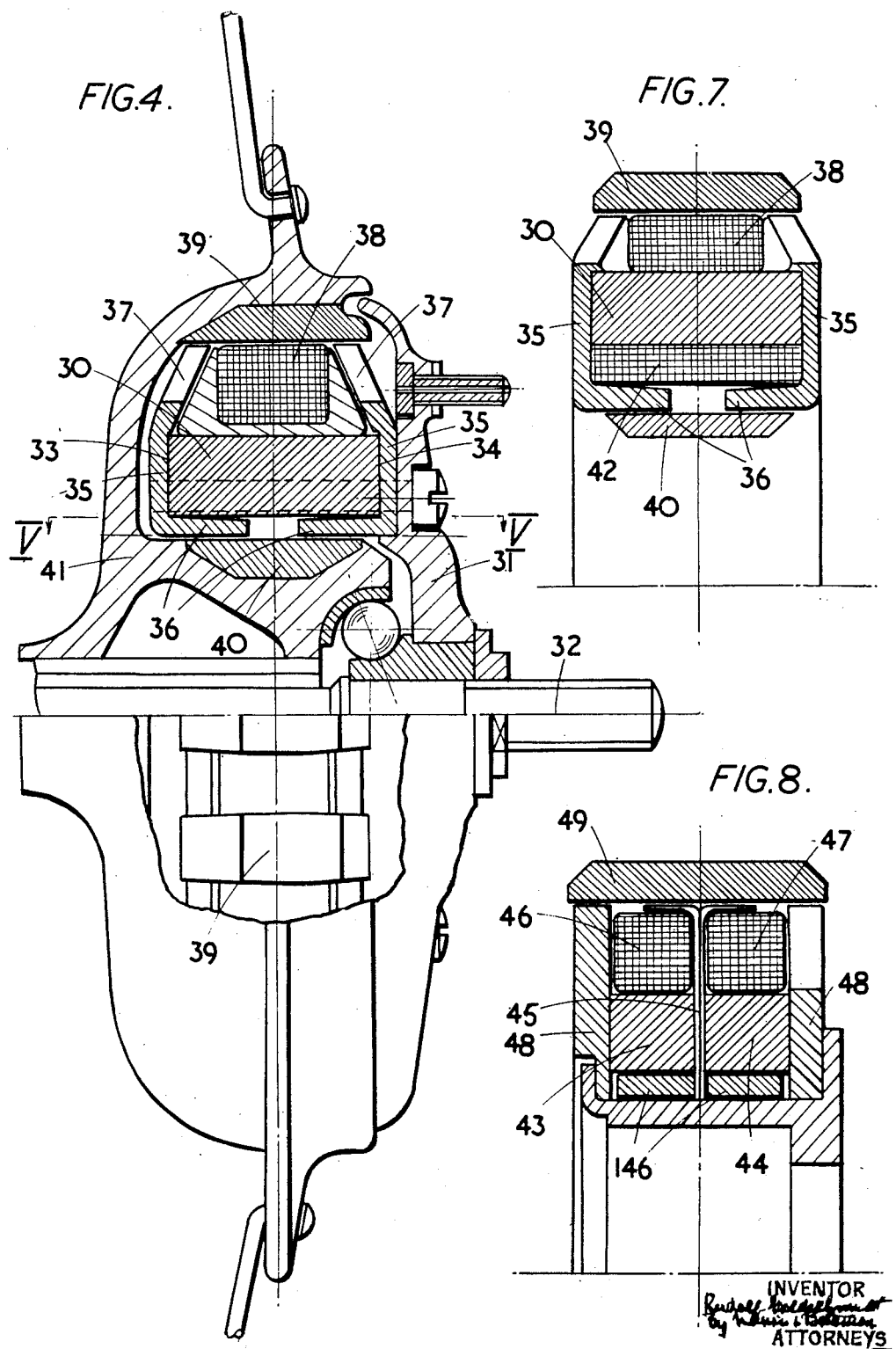

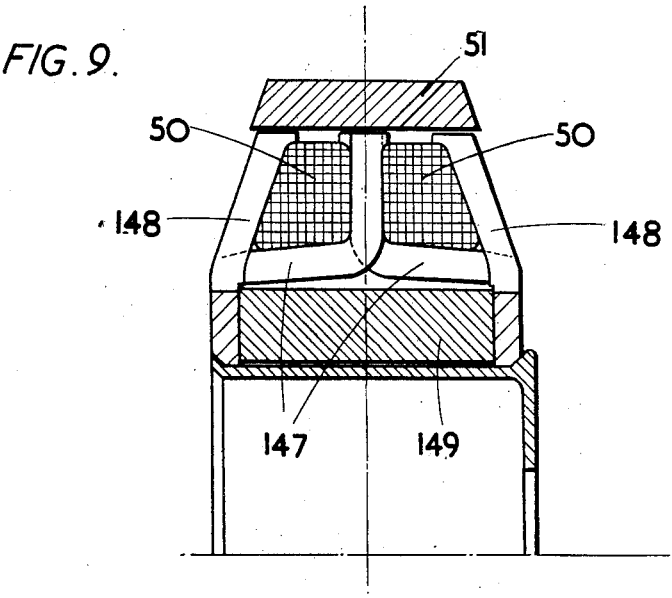
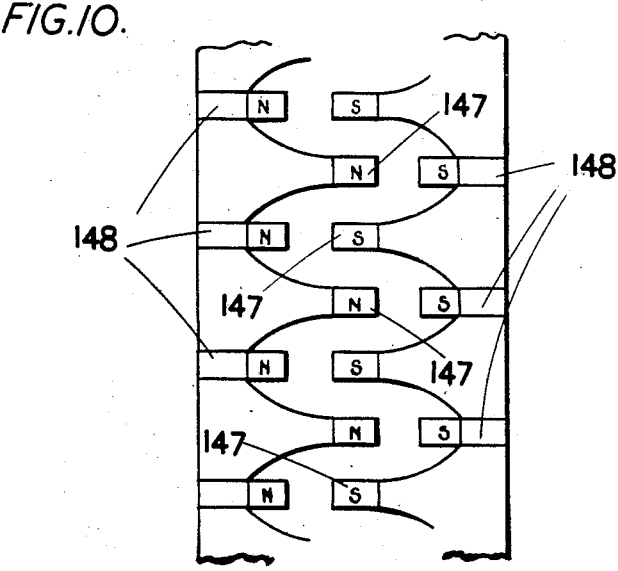

July 25, 1950  R. GOLDSCHMIDT  2,516,380
ALTERNATING CURRENT GENERATOR
Filed Nov. 16, 1948  5 Sheets-Sheet 5
FIG.11.
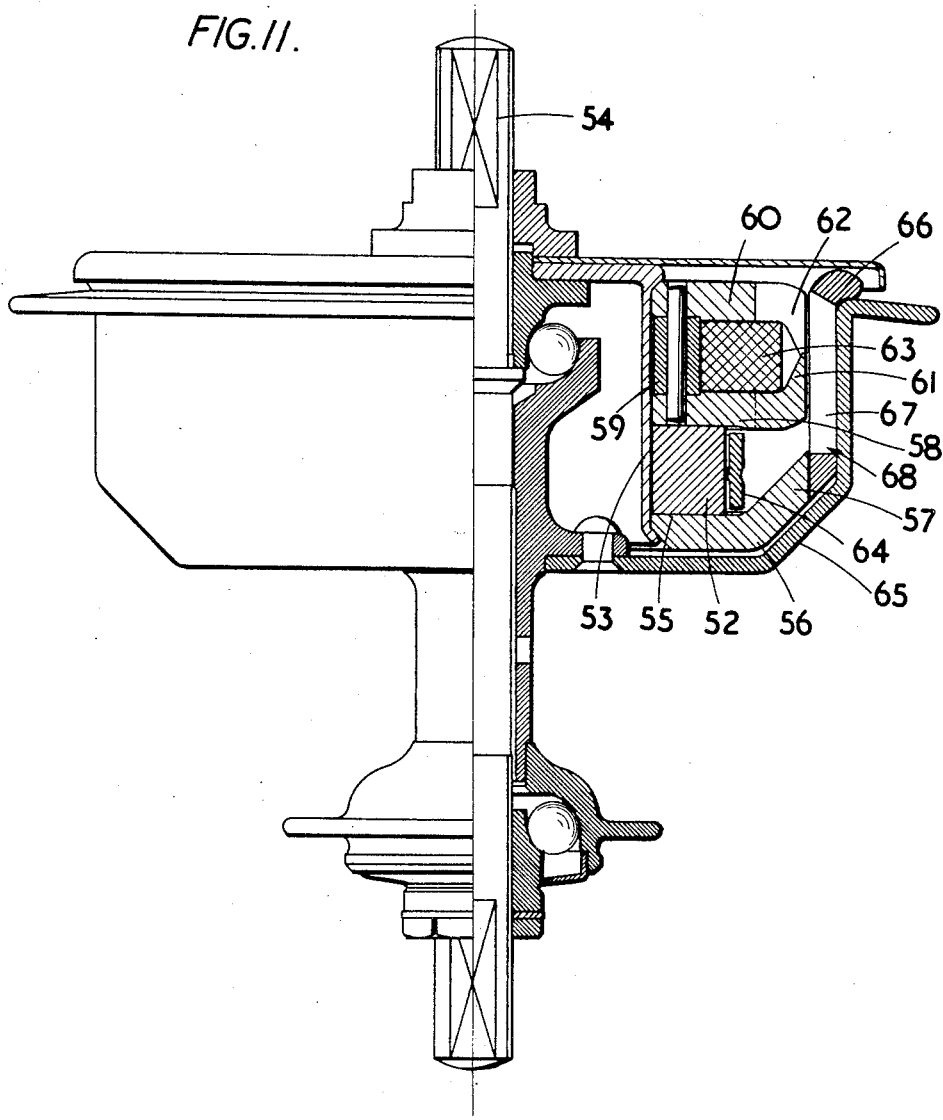
Inventor
Rudolf Goldschmidt
By
Attorney Patented July 25, 1950

2,516,380

UNITED STATES PATENT OFFICE 2,516,380

ALTERNATING CURRENT GENERATOR

Rudolf Goldschmidt, Eckington, England, assignor to The Birmingham Small Arms Company Limited, Small Heath, Birmingham, England, a British company Application November 16, 1948, Serial No. 60,293
In Great Britain November 10, 1945

11 Claims. (Cl. 171—252)

This invention is concerned with improvements in or relating to alternating current generators of the inductor type, in which a permanent magnet providing the field and the armature windings are fixed relative to each other, the necessary changes of flux to produce the electromotive force being produced by masses of magnetic material, or keepers, which rotate relative to the field magnet and the armature windings. It refers particularly to inductor alternators which are adapted to be mounted in the hub of the wheel of a cycle for providing current for lighting purposes.

An alternator can be so constructed that an electric current is induced in a coil either by varying a magnetic flux relative to the coil whereby the flux changes its direction at the required frequency, whereas in an inductor alternator such as the present invention is concerned with, it is in general convenient that the current should be induced by varying the amount of flux between a maximum and minimum while keeping its direction constant. The latter type has certain advantages since it allows of a construction which need contain only a magnet of simple two-pole construction and provided with toothed pole-shoes, over the faces of which a number of iron yokes equal to the number of teeth are arranged to rotate in order to vary the reluctance of the magnetic circuit, a single induction coil being adjacent to or surrounding the magnet. Such a two-polar magnet can remain an unmagnetised blank during assembly, thereby eliminating the dangers of magnetism being destroyed during the work of assembly and of the troubles ensuing from metal swarf which is attracted by and clings to magnetised parts. Such an unmagnetised blank can easily be magnetised from the outside after assembly of the machine.

There are however certain disadvantages associated with such inductor type of generators in which the magnetic field is derived from a permanent magnet inasmuch as a permanent magnet permits only a certain percentage of its magnetism to pulsate when the reluctance of the magnetic circuit is varied periodically, and this particularly applies in the case of modern anisotropic magnets. Under practical reluctance variations, the amount of the magnetic flux which is varied is comparatively low. A further reduction in the effective magnetic flux is caused by the natural leakage, common to all magnetic circuits, which occurs to an even greater extent in the case of a slow-speed high-frequency alternator having numerous narrow pitch poles of opposite polarity. Such leakage increases the inherent impedance of the coil and thereby reduces the output of the generator.

It is an object of the invention to provide a novel form of inductor alternator which is light in weight and compact in structure, and is suitable for use in the hub of a cycle wheel without gearing.

A further object of the present invention is the avoidance or mitigation of mechanical vibration of the magnetic forces and of the loss of energy through such vibration.

It is a further object of the present invention to provide improved inductor alternators in which an increased part of the available magnetic flux emanating from the permanent magnet is utilized for induction purposes whereby the output of a given machine is improved.

Still further objects are to provide such an alternator having a current output which does not vary unduly with the speed of rotation of the cycle wheel and which is of such a frequency that even at low speeds the light does not flicker unduly.

According to the invention an alternating current generator of the inductor type comprises an armature which includes a substantially cylindrical magnet ring magnetized in an axial direction, an armature coil coaxial with the magnet, flux conducting means in contact with both end faces of the magnet, said means having two pole-shoe rings coaxial with the magnet and axially spaced apart to accommodate the armature coil, the pole-shoe rings each having pole teeth with faces lying in a substantially cylindrical surface or surfaces coaxial with the magnet, and also comprising keeper means, the armature and keeper means being relatively rotatable about the axis of the magnet and said means co-operating with the flux conducting means of the armature so that a flux path of varying reluctance is formed which is interlinked with the armature coil and another flux path of varying reluctance is formed which is not interlinked with the armature coil, a reduction in the reluctance of one path occurring substantially simultaneously with an increase in the reluctance of the other path whereby the total flux in the keeper means remains substantially constant.

In order that the invention may be readily understood and carried into effect reference is made to the accompanying drawings illustrating, by way of example, inductor alternators constructed according to this invention which are adapted to be mounted within a hub of a pedal cycle wheel of normal diameter.

In the drawings:

Figure 3 is a sectional view illustrating an inductor alternator according to this invention mounted within the hub of a bicycle;

Figure 4 is a sectional view on line IV—IV of Figure 3;

Figure 5 is an enlarged fragmentary sectional view on line V—V of Figure 4 looking in the direction of the arrows;

Figure 6 is a diagram illustrating the flux variations in the two magnetic paths;

Figure 7 is a sectional view illustrating an alternative construction of inductor alternator;

Figure 8 is a sectional view similar to Figure 7 but illustrating a further alternative construction;

Figure 9 is a sectional view similar to Figure 7 illustrating yet a further alternative construction;

Figure 10 illustrates in the form of a development the magnet structure shown in Figure 9; and Figure 11 is a part sectional view of a further alternative construction.

Figure 1:
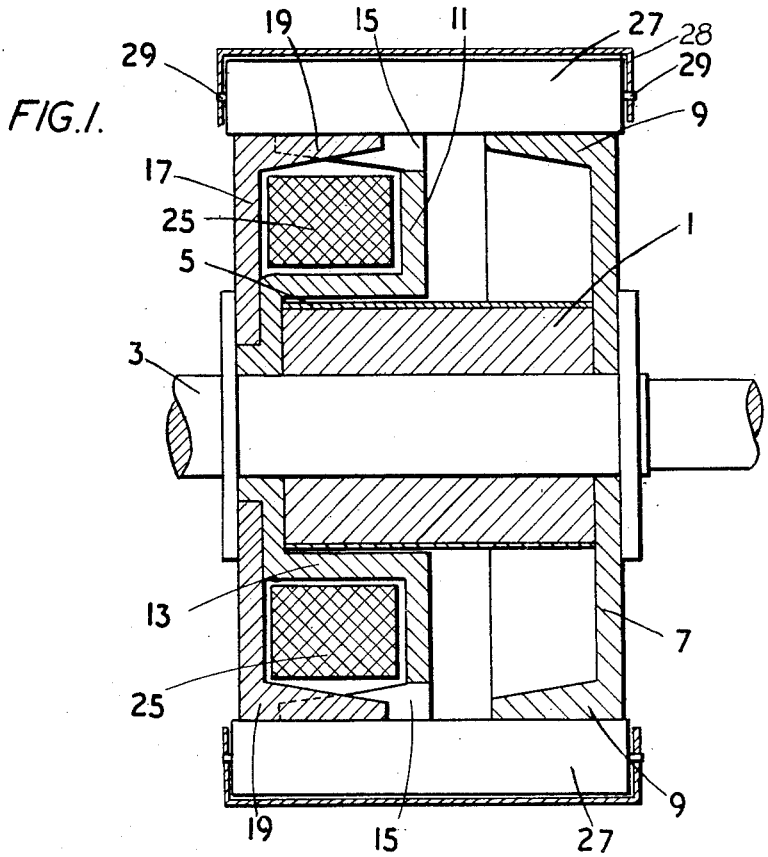
Figure 1 is an elevational view, partly in section, of a generator.
Figure 2:
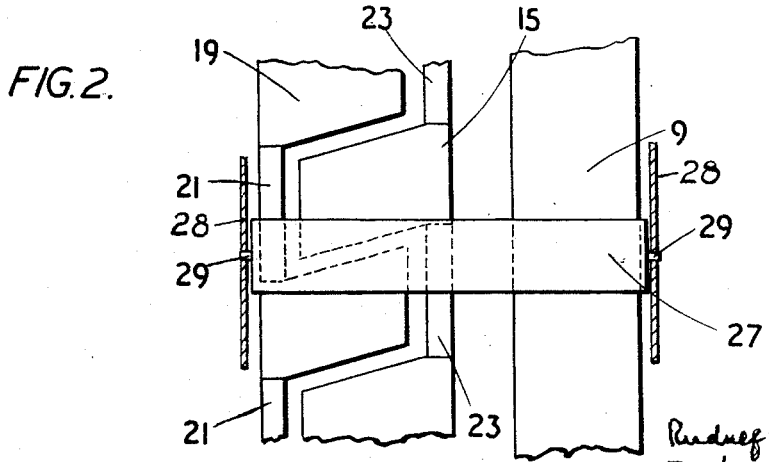
Figure 2 is a diagrammatic view of a part of the cylindrical polar surfaces, showing one keeper element only.

Referring to Figures 1 and 2 the generator which as aforesaid is intended for use in the hub of a bicycle comprises a stationary magnet ring 1 disposed about the stationary hub spindle 3 of a bicycle. The magnet is magnetised in an axial direction, i. e. parallel to the spindle 3. The hub spindle is preferably formed from non-magnetic material and the magnet is surrounded by a copper cylinder 5 for shielding purposes. Surrounding the magnet is an induction coil 25, the ends of which are suitably connected to the lamps of the cycle. A cylindrical dish-shaped iron member 7 is disposed about the spindle 3 and is in contact with and secured to the end face of the magnet having, for example, south polarity; the dish-shaped member thus attains an induced south polarity at its rim 9. The cylindrical rim 9 of the dished member projects inwardly, parallel to the axis of the magnet, and forms a continuous cylindrical polar surface concentric with the surface of the magnet and the hub spindle.

A pole-shoe ring 11 with a boss 13 is disposed about the spindle in contact with the end face of the magnet having north polarity, being firmly affixed thereto. The rim of this pole-shoe ring 11 has pole-shoes in the form of teeth 15 formed thereon which extend across the outer circumference of the coil 25. These pole-shoes or teeth (hereinafter called "the inner teeth") are separated by gaps 23, each gap being slightly wider than a tooth.

A further pole-shoe ring 17 is disposed about a spindle in contact with and secured to the boss of the pole-shoe ring 11 on the north pole-face of the magnet. This pole-shoe ring 17 is similar to the pole-shoe ring 7 and has formed on its rim pole-shoes in the form of teeth 19 which extend across the outer circumference of the coil 25. These pole-shoes or teeth (hereinafter called "the outer teeth") are separated by gaps 21, each gap being slightly wider than a tooth. The pole-shoe rings 17 and 11 both have an induced north polarity, are arranged so that the inner teeth 11 and the outer teeth 19 interdigitate, being separated from each other by a small air-gap.

The diameters of the pole-shoe rings 11 and 17 and of the member 9 are equal so that the teeth 15 and 19, which have north polarity, together with the rim of the member 9, which has south polarity, all lie virtually on one cylindrical surface, which is coaxial with the magnet and the hub spindle, the two series of teeth 15 and 19 being separated from each other by an air-gap and the inner teeth 15 being separated from the rim of the member 9 by an air-gap. A convenient number of teeth is thirty-two, that is sixteen teeth on each of the pole-shoe rings 11 and 17.

For rolling around and connecting the inner and outer teeth of north polarity with the rim of south polarity, there is provided a series (e. g. 16) of keeper pieces in the form of ferromagnetic rollers 27 of about the same length as the magnet and disposed parallel to its axis. These rollers are loosely mounted, for example with a play of one thirty second of an inch, on spindles 29 forming part of a cage 28 fixed for rotation with the hub of the wheel. As the hub rotates the rollers 27 roll over the race formed by the teeth 15 and 19 and the rim of the member 9, the rollers tending to adhere to the race under the magnetic forces emanating from the race. If the rollers are in contact at one end with the outer teeth 19 and are not in contact with the inner teeth 15 because of the spaces 23 the air-gap between the induced north pole and the induced south pole is short-circuited and the flux from the magnet flows through the pole-shoe ring 17, the outer teeth 19, the rollers 27 and the member 9 thereby being interlinked with the coil. As the rollers move into contact with the inner teeth 15 and leave the outer teeth 19, the air-gap between the induced north and south poles still remains short-circuited but now the flux flows through the pole-shoe ring 11, its teeth 15, the rollers 27 and the member 9 and so by-passes the coil. Thus the whole magnetic flux (apart from leakage) is interlinked with the coil and the constant periodical variations of this flux linkage from a maximum to a minimum causes an alternating electromotive force to be induced in the coil proportional to the rate of change of flux. The total flux emanating from the permanent magnet will remain substantially constant, but the flux interlinked with the coil is at a minimum during the period of contact of the rollers with the inner teeth 15 and when the rollers leave the inner teeth 15 and move into contact with the succeeding outer teeth 19 the flux interlinked with the coil increases to its full value. Thus it will be seen that as the rollers roll over the race formed by the rims 9, 15 and 19, an alternating electromotive force is produced and that the frequency and amplitude of this electromotive force increases with the number of teeth and the corresponding rollers.

The increase in the amplitude of the current produced in the lamps by this electromotive force as the speed of the cycle increases from a rate (say 10 miles per hour) is kept substantially constant because of the high impedance of the coil 25 due to the air-gap between the teeth 15 and the teeth 19 which allows the internal reaction flux produced by the induced alternating current to compensate a large part of the primary flux variation produced by the rollers. Thus as the speed increases, the induced electromotive force increases but a back electromotive force is produced which also increases with the speed at a similar rate as that of the induced electromotive force. The net amount of current in the lamps to which the coil is connected thus remains relatively constant above a certain minimum speed, say ten miles per hour, so that a further increase of speed does not cause the lamp filaments to burn out.

The value of the current provided by the illustrative generator may be made suitable for lighting the lamps by selecting an appropriate number of turns of the coil, bearing in mind the total resistance external to the generator.

It will be appreciated that only the teeth 15 and 19 participate in flux variations since the rollers 27 constantly contact the rim of the member 7 and one or other or both sets of teeth 15 and 19 and that therefore the total flux in the keeper pieces remains substantially constant. Due to the small volume of the teeth hysteresis and eddy current losses are small even if the pole-shoes are made out of solid i. e., not laminated, material. The copper cylinder 6 surrounding the magnet shields it from the field set up by the alternating current in the coil, thereby assisting in preventing excessive demagnetisation of the magnet. To produce silent running the teeth 15 and 19 and the rim 8 of the member 7 may be covered with a thin layer (e. g. 2-3 thousandths of an inch) of resilient cushioning material such as rubber.

In a modification of the alternator the member 7 is replaced by a pair of pole-shoe rings similar to the rings 11 and 17. A second coil connected either in series, or advantageously in parallel, with the first coil 25 is provided for co-operation with these rings.

Referring to Figures 3, 4, 5 and 6 a permanent magnet ring 30 is non-rotatably mounted within and secured to a fixed part 31 of the hub, being disposed concentrically about the hub spindle 32, with its magnetic axis parallel with the axis of the spindle and two pole-faces 33 and 34 for extending north and south polarity. Disc-like members 35 constituting the pole-shoes are fixed in close contact with the flat pole-faces of the magnet, said pole-shoes being provided with an equal number of inner and outer peripheral teeth 36 and 37, which are equally spaced and arranged in axial alignment. Disposed in the space between the outer peripheral teeth 37 of the pole-shoes, and surrounding the magnet 30, is an induction coil 38 which, together with the pole-shoes and magnet, constitute the stationary elements of the generator.

The magnetic circuit is completed by two keeper rings 39 and 40 which comprise cylindrical elements. The outer ring 39 has an internal diameter slightly greater than the external diameter of the pole-shoes 37 measured over the ends of the outer teeth, while the inner ring 40 has an external diameter slightly less than the internal diameter of the shoes 35 measured over the ends of the inner teeth. These keeper rings 39 and 40 have axially projecting keeper pieces which are equal in number to the teeth on the pole-shoes. Both keeper rings are secured to a moving part 41 of the wheel hub whereby they rotate in the same direction relative to the stationary pole-shoes.

When the generator is developing electrical energy the outer keeper ring 39 is momentarily positioned so that its keeper pieces face the gaps between the outer teeth on the pole-shoes 35 thereby making a maximum reluctance of the first magnetic or main path. In this position of the outer keeper ring, the keeper pieces on the inner keeper ring 40 are arranged to be opposite the inner teeth on the pole-shoes 35, thereby making a minimum reluctance of the second magnetic or shunt path. Thus the magnetic flux passes alternately over the two magnetic paths thereby inducing electromotive forces in the coil.

As previously stated the efficiency of the generator may be further increased by the addition of a second coil which utilises the flux pulsations of the second magnetic or shunt path. As seen in Figure 7, such second coil 42 is located on the inside of the magnet 30, and may be either in parallel or series with the outer induction coil 38.

In a modified arrangement, as shown in Figure 8, the magnet and coil may be divided into two parts each magnet 43 and 44 being in axial alignment and having a ferro-magnetic bridge piece 45 between them and the coils 46 and 47. In this case the two outer induction coils 46 and 47 are mounted concentric with the magnets between the toothed pole-shoes 48, and constitute the stationary parts of the generator. An outer rotating keeper ring 49 provided with complementary keeper pieces as previously described conducts the magnetic flux from one pole-shoe to the bridge piece, and from the bridge piece to the other pole-shoe, but in this case the teeth are staggered on one pole-shoe relative to the teeth on the other pole-shoe so that when the keeper pieces on the keeper rings are opposite the teeth on one of the pole-shoes, they are facing the gaps between the teeth on the other pole-shoe. In consequence the flux travels either around one coil via a pole-shoe ring, keeper pieces, and bridge piece, or around the other coil via the bridge piece, keeper pieces and the other pole-shoe ring. Thus, the total flux carried by the whole keeper assembly may be kept substantially constant, avoiding the disadvantages already referred to. The two induction coils may be connected either in series or parallel.

In order to provide a shunt with a constant reluctance which is greater than the minimum reluctance of the main paths but less than the maximum reluctance of the main paths, a pair of stationary iron rings 146 constituting a third auxiliary pole-shoe are incorporated, such rings being preferably located on the inside of the magnets.

In a further modified arrangement, as shown in Figure 9, the inner peripheral teeth of the pole-shoes which, in previous constructions, are disposed in the interior of the magnet between said magnet and an inner keeper ring, are in this modification arranged to lie in the space occupied by the outer peripheral teeth of the pole-shoes and surrounding the magnet. These teeth 147 are circumferentially spaced between the teeth 148 and the teeth 147 on one pole-shoe are in axial alignment with the teeth 148 on the other pole-shoe. Disposed in the annular space between the teeth 147 and 148, and surrounding the magnet 149, are two induction coils 50 connected either in series or parallel and mounted concentric with the magnet between the pole-shoes, said coils, magnet and pole-shoes constituting the stationary elements of the generator.

The magnetic circuit is completed by a single outer keeper ring 51 whereby, when the generator is developing electrical energy, two magnetic paths are created outside the magnet. This is in contra-distinction to the previous arrangements where one magnetic path passes outside of the magnet while the other path passes through the bore of said magnet. The same conditions prevail however as regards flux supply in these two parallel outside magnetic paths inasmuch as an increase in the reluctance of one path occurs substantially simultaneously with a decrease in the reluctance of the other path.

While in the illustrative constructions of generator above described the keeper ring or rings is the only rotating element of the structure, the generator would of course function with equal efficiency by mounting the magnet, pole-shoes and coil so that they participate in a rotation relative to a fixed keeper ring, but the former arrangement is preferable in order to obviate the necessity for providing slip rings and brush gear, and to reduce the rotating masses to a minimum.

Referring to Figure 11 a magnet ring 52 is carried by a non-magnetic sleeve 53 which is secured rigid with the spindle 54. The magnet is magnetised axially and in contact with one pole face 55 is a pole conveyor plate 56 which has an uninterrupted periphery 57. In contact with the other pole face is a pole-shoe ring 58 which is connected magnetically through a spacer ring 59 to another pole-shoe ring 60. The pole-shoe rings 58 and 60 are provided with interdigitated teeth 61 and 62 respectively. An armature or induction coil 63, also in the form of a ring, is embraced by the pole-shoe rings 58 and 60. Surrounding and supported by the magnet 52 is a ring 64 made of a material having good electrical conductivity, for example, copper or aluminum, in which currents are induced by changes of flux emanating from the magnet 52. These currents create magnetomotive forces which oppose the changes of flux and tend to keep the flow of flux constant.

Forming part of the hub is a shell 65, which is of ferromagnetic material and which carries a keeper ring 66, also of ferromagnetic material. The keeper ring has slots 67 to form circumferentially spaced bars 68 but the ring may be built up in any convenient manner, for example, the bars may be formed by inserts.

When the hub shell 65 is rotated and with it the keeper ring 66, the slots 67 and bars 68 cause the coil 63 to be cut by a varying magnetic flux and an alternating current having 28 pulses per revolution is induced therein. In this manner the shell is utilised doubly, not only mechanically for forming the hub of the wheel but also for carrying the magnetic flux.

Alternatively the conveyor plate may be dispensed with and the shell conducts the whole of the magnetic flux.

Having thus described my invention, what I claim as new and desire to secure by Letters Patent is:

1. An alternating current generator of the inductor type comprising an armature which includes a substantially cylindrical magnet ring magnetized in an axial direction, an armature coil coaxial with the magnet, flux conducting means in contact with both end faces of the magnet, said means having two pole shoe rings coaxial with the magnet and axially spaced apart to accommodate the armature coil, the pole shoe rings each having pole teeth with faces lying in a substantially cylindrical surface or surfaces coaxial with the magnet, and also comprising keeper means, the armature and keeper means being relatively rotatable about the axis of the magnet and said means co-operating with the flux conducting means of the armature so that a flux path of varying reluctance is formed which is interlinked with the armature coil and another flux path of varying reluctance is formed which is not interlinked with the armature coil, a reduction in the reluctance of one path occurring substantially simultaneously with an increase in the reluctance of the other path whereby the total flux in the keeper means remains substantially constant.

2. An alternating current generator according to claim 1, wherein the two toothed pole shoe rings are magnetically connected to one pole of the magnet and the teeth on one pole shoe ring are staggered relative to the teeth on the other pole shoe ring, and comprising a ring conveyor member magnetically connected with the other pole of the magnet and cooperative with the keeper means.

3. An alternating current generator according to claim 2, comprising a ring of good electrically conductive material surrounding the magnet.

4. An alternating current generator according to claim 3, comprising a non-magnetic sleeve on which the armature is mounted, and a shell made of magnetic material in which the keeper means is mounted.

5. An alternating current generator according to claim 4, wherein the keeper means comprises an uninterrupted annular portion in proximity to the ring conveyor member, and a series of circumferentially spaced axial bars adapted to move in proximity to the two pole shoe rings.

6. An alternating current generator according to claim 5, wherein the teeth on the two pole shoe rings are interdigitated.

7. An alternating current generator according to claim 3, wherein the keeper means comprises a cage, and a series of rollers disposed parallel with the axis of the magnet and movable with the cage over the substantially cylindrical surfaces of the pole teeth and the conveyor member.

8. An alternating current generator according to claim 7, wherein the axis of the pole teeth is skew with the axes of the rollers.

9. An alternating current generator according to claim 1, comprising one pole shoe ring connected with one pole of the magnet and another pole shoe ring connected with the other pole of the magnet, radial teeth projecting outwardly from each ring to form part of the magnetic path interlinked with the armature coil and the teeth on one ring being axially aligned with the teeth on the other ring, and pole teeth on each pole shoe ring projecting axially into the bore of the magnet and said teeth on one ring being axially aligned with the teeth on the other ring and being staggered relative to the outwardly projecting teeth.

10. An alternating current generator according to claim 9, comprising a second armature coil disposed concentrically within the bore of the magnet, said second armature coil being electrically connected to the other armature coil and being magnetically interlinked with the flux path of which the axially extending pole teeth in the bore of the magnet form part.

11. An alternating current generator in accordance with claim 1, comprising the combination in which outwardly projecting radial teeth on one pole shoe ring connected to one pole of the magnet are staggered relative to outwardly projecting radial teeth on the other pole shoe ring connected to the other pole of the magnet and additional outwardly projecting radial teeth are formed on the pole shoe rings and are disposed axially between the other teeth to divide the armature coil into two parts electrically connected together, the additional teeth on one pole shoe ring being aligned with the other teeth on the other pole shoe ring.

RUDOLF GOLDSCHMIDT.

REFERENCES CITED

The following references are of record in the file of this patent:

UNITED STATES PATENTS

| Number    | Name       | Date           |
|-----------|------------|----------------|
| 857,394   | Hallock    | June 18, 1907  |
| 1,333,119 | Krag-Moller | May 9, 1920   |
| 1,684,343 | Cardellino | Sept. 11, 1928 |